United States Patent Office 3,452,642
Patented July 1, 1969

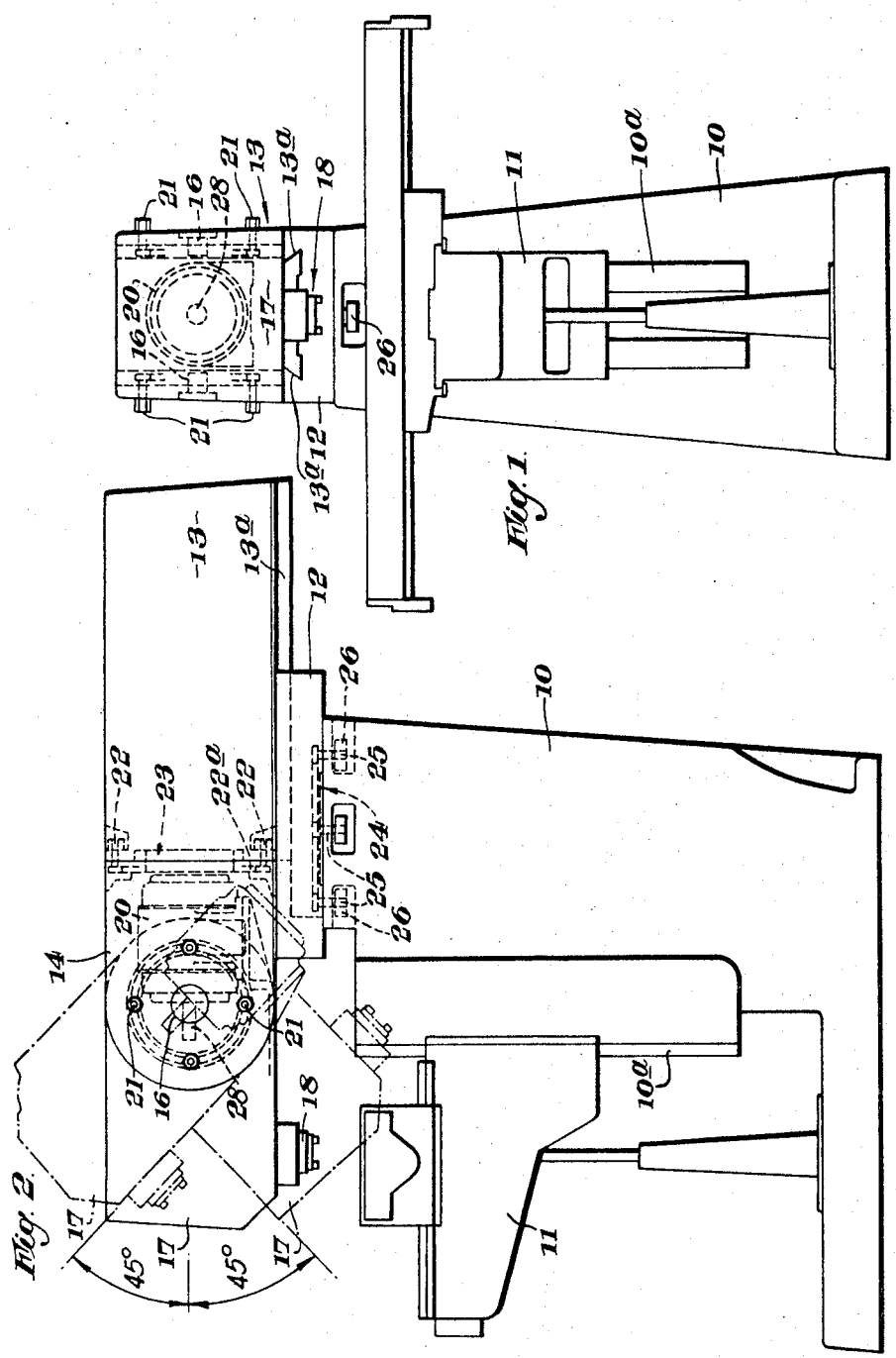

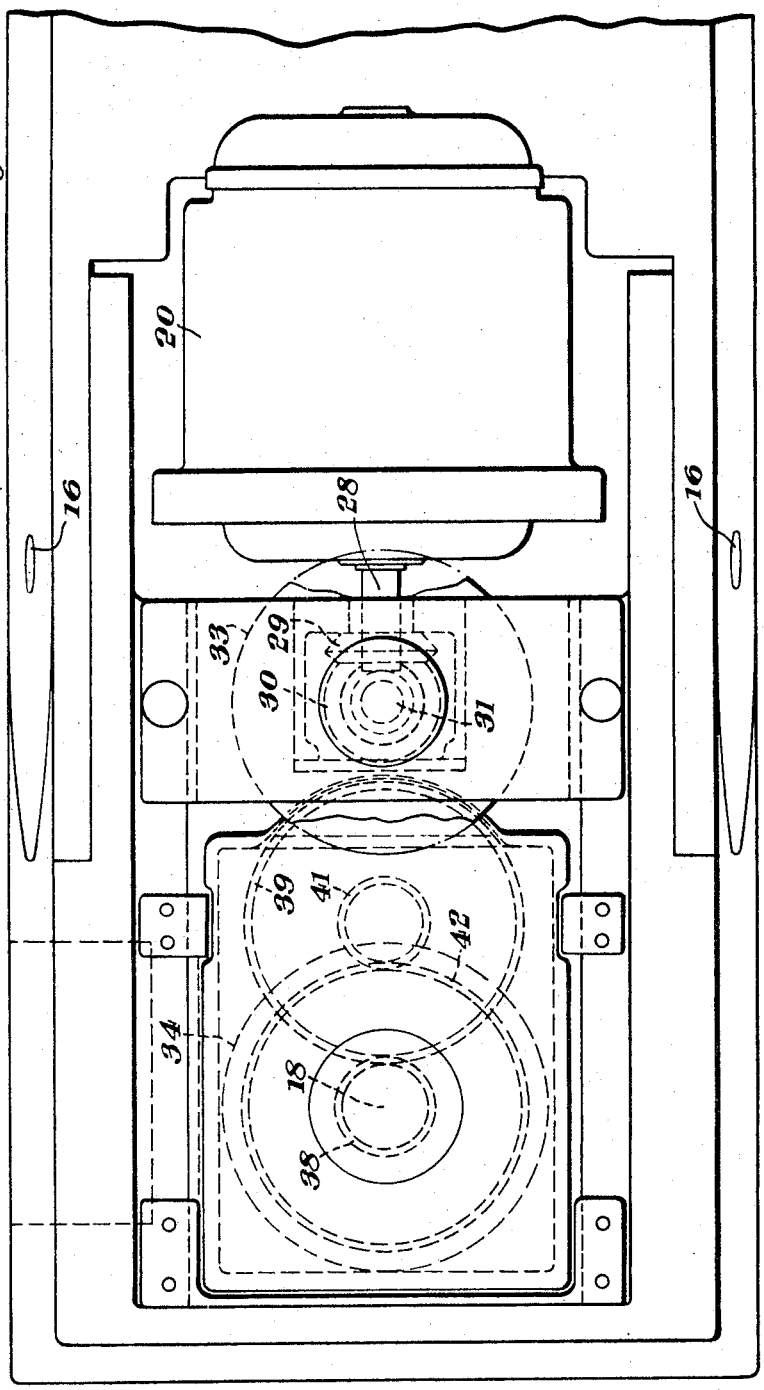

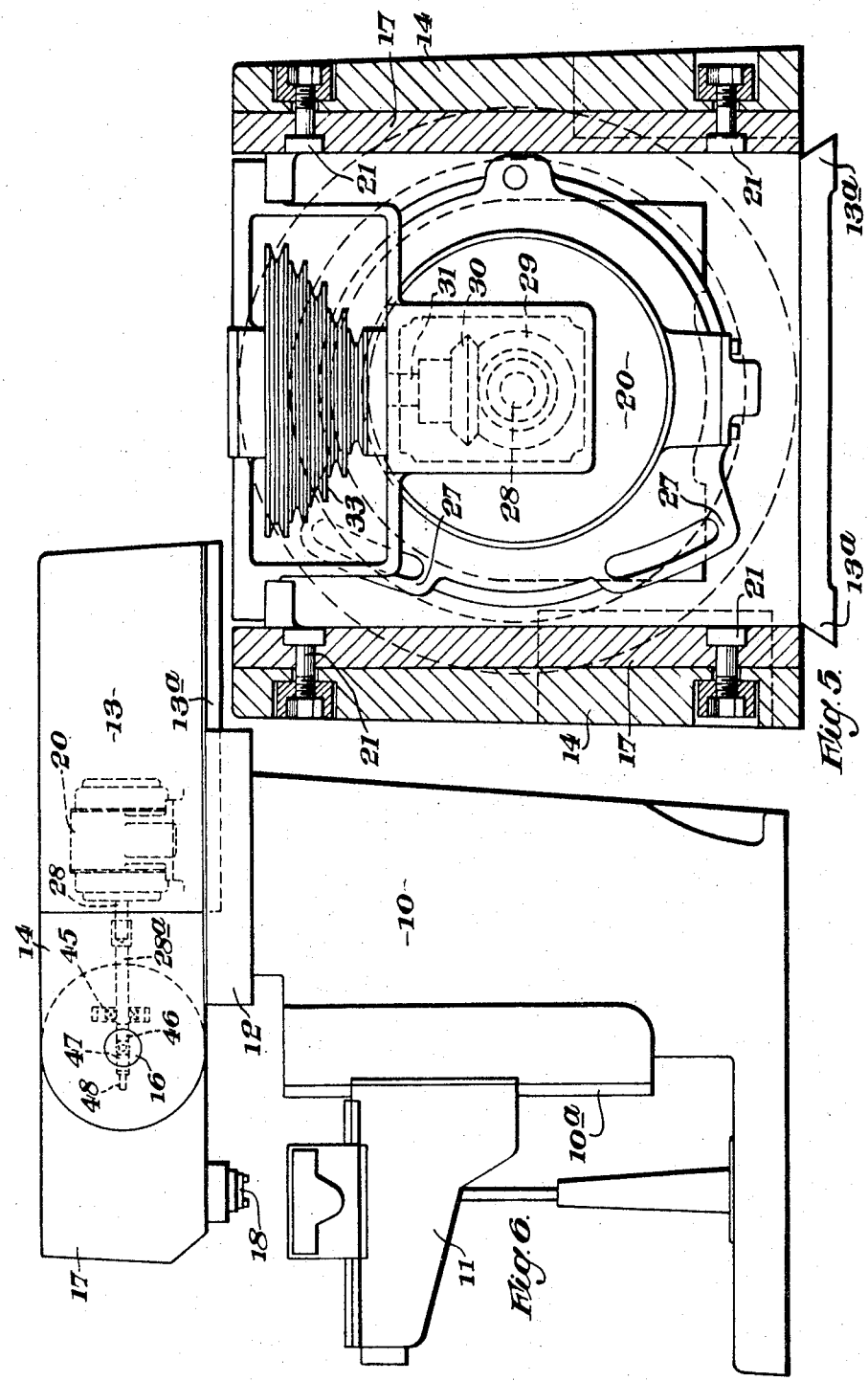

3,452,642
TURRETHEAD MILLING AND LIKE METAL-
WORKING MACHINE
Victor H. Balding, Beavers Wood, Ringland Road,
Taverham, Norwich, England
Filed May 19, 1966, Ser. No. 551,278
Claims priority, application Great Britain, May 24, 1965,
21,964/65
Int. Cl. B23c 1/12; B23b 39/00
U.S. Cl. 90—17                     4 Claims

ABSTRACT OF THE DISCLOSURE

A turrethead metalworking tool in which the head can be turned on a horizontal axis in a bracket support, the tool spindle and a driving motor for same being mounted in the head on opposite sides of the turning axis to provide a counterbalanced assembly.

This invention concerns turrethead milling and like metalworking machines. It is a primary object of the present invention to provide a novel form of such a machine wherein the problem of imbalance of the head is avoided. A further object of the present invention is to obviate the employment of adjusting members, such as worm and handwheel and the like.

Yet another and important object of the invention is to provide a machine in which the head which carries the tool holder can be turned about a horizontal axis manually without the use of any mechanical transmission.

The head, bracket, overarm, pedestal and knee may each be lockable in a desired orientation of their respective movements.

The invention will be described further, by way of example, with reference to the accompanying drawings, in which:

FIGURE 1 is a front view of a preferred embodiment of a turrethead metalworking machine in accordance with the present invention.

FIGURE 2 is a side elevation of the machine shown in FIGURE 1.

FIGURE 4 is a plan view and FIGURE 5 is an end view of the head shown in FIGURE 3, and FIGURE 6 is a side view, similar to FIGURE 2, of an alternative form of machine of the present invention.

In the drawings, like reference numerals have been used to designate similar parts.

Figure 3:
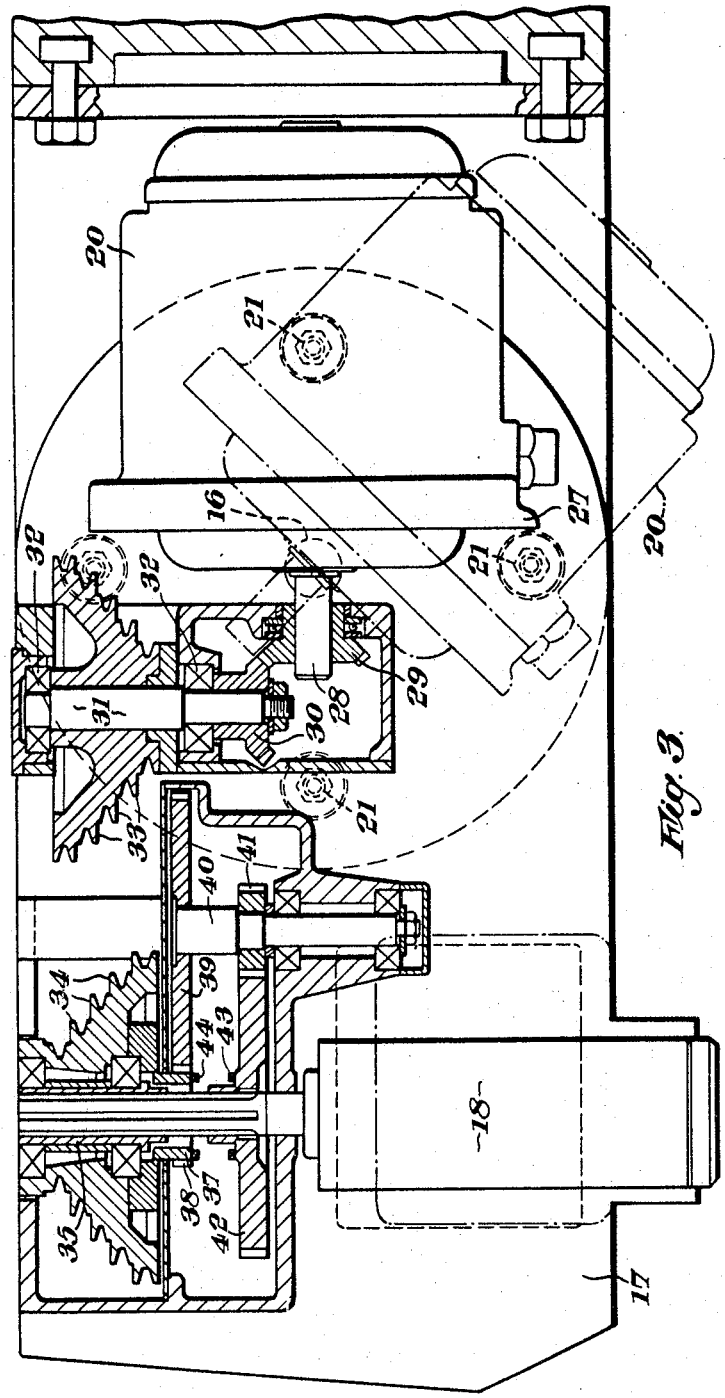
FIGURE 3 is a side view, partly in section and to an enlarged scale, of the head of the machine of FIGURES 1 and 2.

Reference will now be made to FIGURES 1 to 5.

A turrethead metalworking, for example milling machine, constructed in accordance with the present invention comprises a column 10 which supports, in V or square-ways 10a, a vertically slidable knee 11 and also a pedestal 12. The pedestal 12 is located on top of the column 10 by a locating ring 24, and can be clamped in any position of rotation about a perpendicular axis by means of T-bolts 25, of which there are conveniently four. The T-bolts 25 are located in a T-slot in the pedestal 12, and through the top of the column 10, and nuts 26 thereof are accessible through recesses in the column to tighten the bolts and hence clamp the pedestal when desired.

The pedestal 12 provides a slideway wherein correspondingly shaped slides 13a of an overarm 13 locate. Any convenient form of locking means may be provided for locking the sliding movement of the overarm relative to the pedestal 12. The overarm 13 supports a bracket 14 by means of a locating ring 23, and T-bolts 22, which locate in a circular T-slot 22a, enable the bracket 14 to be clamped in any desired position of rotation about a horizontal axis defined by the spigot location 23.

A head 17 having a cutter spindle 18 is supported in the bracket 14 by stub axles 16. T-bolts 21 serve to lock the head 17 in any desired position within the limits of its rotation about the horizontal axis defined by the stub axles 16. The spindle 18 is thus movable about either of two horizontal axes and a vertical axis, and is also capable of sliding movement with the overarm 13. In practice, it may be desirable for the head to be rotatable about the axles 16 through an arc of only approximately 90°, as indicated in chain dashed lines in FIGURE 2.

Referring now to FIGURE 3, the head 17 is shown to an enlarged scale, and to a certain extent diagrammatically.

It will be seen that a motor 20 is mounted on a flange 27, or a foot mounted motor may be used, in the head 17. A shaft 28 of the motor 20 has a bevel gear 29 thereon which meshes with a bevel gear 30 of a pulley shaft 31 mounted in bearings 32 in a part of the head 17. A V-belt (not shown) engages one of the pulleys 33 of this shaft, and a corresponding one of the pulleys mounted on a sleeve 35 rotatable on the spindle 18. A back gear 37 of the sleeve 35 drives a gear 38 and a gear 39 of a lay shaft 40. A gear 41 of the lay shaft 40 meshes with a pinion 42 splined to the spindle 18. The pinion 42 and the back gear 37 each have toothed faces 43, 44 respectively, the pinion 42 being slidable longitudinally of the spindle, out of mesh with the gear 41, and into clutching engagement with the gear 37 so as to provide a direct drive, at a different gear ratio if desired, to the spindle 18. The lay shaft 40 may drive a tachometer or other arrangement.

The motor 20 is mounted in the head 17 so that its mass resides at one side of the axle 16, and is arranged, with ballast if necessary, to counterbalance the weight of the spindle and its appropriate gear and pulley drive arrangement, and hence permits an operator to readily adjust the position of the head 17 about the horizontal axis defined by the axles 16.

The invention is not confined to the precise details of the foregoing example, and variations may be made thereto. For instance, in FIGURE 6 there is shown a second embodiment of machine in accordance with the present invention. Whilst the machine there shown does not possess all the advantages of the machine of FIGURES 1 to 5, particularly in that the head 17 is only capable of limited rotation about the axles 16, it possesses advantageous features.

The machine shown in FIGURE 6 is identical to that described in FIGURES 1 to 5, insofar as the construction of the column 10, knee 11, and pedestal 12 are concerned. However, the motor 20 is mounted in the overarm 13 with its rotor axis coaxial with the location of the spigot 23 (not shown). A propeller shaft 28 of the motor 20 extends into the bracket 14 and is supported therein in a bearing block 45. The free end of the shaft 28a has a first half 46 of a universal coupling which lies on the horizontal axis defined by the stub axles 16. A spindle drive arrangement (illustrated diagrammatically at 48) provides the other half 47 of the universal coupling.

The head is capable of pivoting about the axles 16 through an angle of approximately 25° either side of a central position where the halves 46, 47 are co-linear.

In both the embodiments described the head 17 is well balanced, and is so arranged that adjustment thereof without the need to use worm and handwheel or like arrangements, with a consequent saving in cost. Moreover, the design of the machine of FIGURES 1 to 5 is such that the head 17 can occupy an extremely wide range of positions as compared with conventional turrethead machines.

It will be seen that the complete head assembly can be removed from the machine easily for interchange.

The invention is applicable to turrethead metalworking machines other than milling machines and is to be considered limited only, as to scope or spirit, by the appended claims.

I claim:

1. A turrethead metalworking tool comprising a column, a vertically slidable knee and a pedestal mounted on said column, said pedestal being mounted for turning about a vertical axis, an overarm mounted on a slideway on said pedestal so as to be capable of horizontal movement, a bracket support at one end of said overarm capable of turning on a horizontal axis, a head supported by said bracket and capable of turning on a horizontal axis at a right angle to the axis of turning of the bracket support, an electric motor in said head adjacent to the overarm on one side of the turning axis of the head, a tool spindle in said head on the other side of its turning axis, variable drive gearing from said motor to said spindle, said motor serving to counterbalance the head in relation to the turning of said head on its horizontal axis.

2. A turrethead metalworking machine as claimed in claim 1, wherein means are provided for locking the head in a desired orientation of its movement.

3. A turrethead metalworking machine as claimed in claim 2, wherein the drive gearing comprises a first assembly of pulley wheels driven by the motor through bevel gearing, a second assembly of pulley wheels co-axially on a shaft of the tool spindle and belt driven by the first assembly and a gear wheel drive from said assembly to a gear wheel mounted on splines on said shaft.

4. A turrethead metalworking machine as claimed in claim 3, wherein said second assembly of pulley wheels has teeth on its surface adjacent the gear wheel on the shaft, which gear wheel has teeth on its adjacent surface and is slidable on said shaft from a position in which said teeth engage for direct drive of the spindle by the second pulley wheel assembly, and in which the drive through the gear wheel drive is interrupted.

References Cited

UNITED STATES PATENTS

| | | | |
|---|---|---|---|
| 3,080,794 | 3/1963 | Grabes | 77—31 X |
| 2,499,842 | 3/1950 | Armitage | 90—17 |
| 2,445,039 | 7/1948 | Rusnok | 90—17 X |
| 2,349,004 | 5/1944 | Richards | 90—17 |
| 2,310,870 | 2/1943 | Retterath | 77—28 |
| 2,289,874 | 7/1942 | Curtis | 90—17 |

ANDREW R. JUHASZ, *Primary Examiner.*

G. WEIDENFELD, *Assistant Examiner.*

U.S. Cl. X.R.

77—31